United States Patent
Ishii

(10) Patent No.: US 10,014,514 B2
(45) Date of Patent: Jul. 3, 2018

(54) NONAQUEOUS SECONDARY BATTERY HAVING HIGH VOLUME CAPACITY DENSITY

(71) Applicant: TOYOTA JIDOSHA KABUSHIKI KAISHA, Toyota-shi, Aichi-ken (JP)

(72) Inventor: Kenta Ishii, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/310,541

(22) PCT Filed: May 13, 2015

(86) PCT No.: PCT/IB2015/000690
§ 371 (c)(1),
(2) Date: Nov. 11, 2016

(87) PCT Pub. No.: WO2015/177617
PCT Pub. Date: Nov. 26, 2015

(65) Prior Publication Data
US 2017/0077486 A1    Mar. 16, 2017

(30) Foreign Application Priority Data

May 19, 2014    (JP) ................................ 2014-103272

(51) Int. Cl.
*H01M 2/34*    (2006.01)
*H01M 4/587*    (2010.01)
(Continued)

(52) U.S. Cl.
CPC .......... *H01M 2/345* (2013.01); *H01M 4/587* (2013.01); *H01M 10/058* (2013.01);
(Continued)

(58) Field of Classification Search
CPC .......... H01M 2004/021; H01M 10/04; H01M 10/058; H01M 2010/4292
See application file for complete search history.

(56) References Cited

U.S. PATENT DOCUMENTS

| | | | |
|---|---|---|---|
| 2013/0196189 A1 | 8/2013 | Minami et al. | |
| 2014/0067340 A1* | 3/2014 | Buma | F16F 9/3235 703/1 |

(Continued)

FOREIGN PATENT DOCUMENTS

| | | |
|---|---|---|
| JP | 11-054147 A | 2/1999 |
| JP | 2011-86617 A | 4/2011 |

(Continued)

*Primary Examiner* — Imran Akram
(74) *Attorney, Agent, or Firm* — Sughrue Mion, PLLC

(57) ABSTRACT

In a nonaqueous secondary battery including a pressure-operated current interrupt device, a ratio (Vt/Cr) of a sum Vt ($cm^3$) of an effective pore volume Vp of the positive electrode active material layer, an effective pore volume Vn of the negative electrode active material layer, and a pore volume Vs of the separator to a volume Cr ($cm^3$) of a remaining space in the battery case is 0.92 to 1.05. The volume Cr of the remaining space in the battery case is calculated by subtracting a volume Ce of the electrode body, a volume Cna of the nonaqueous electrolytic solution, and a volume Cc of auxiliary components from a volume Ct of the battery case. The remaining space volume Cr ($cm^3$) is 14.8 vol % or higher of the volume Ct ($cm^3$) of the battery case.

6 Claims, 6 Drawing Sheets

(51) Int. Cl.
| | |
|---|---|
| *H01M 10/0525* | (2010.01) |
| *H01M 10/42* | (2006.01) |
| *H01M 10/0567* | (2010.01) |
| *H01M 10/058* | (2010.01) |
| *H01M 4/02* | (2006.01) |

(52) U.S. Cl.
CPC ... *H01M 10/0525* (2013.01); *H01M 10/0567* (2013.01); *H01M 10/4235* (2013.01); *H01M 2004/021* (2013.01); *H01M 2004/027* (2013.01); *H01M 2200/20* (2013.01); *Y02T 10/7011* (2013.01)

(56) References Cited

U.S. PATENT DOCUMENTS

| | | | |
|---|---|---|---|
| 2014/0117940 A1* | 5/2014 | Takahata | H01M 4/13 320/134 |
| 2014/0346046 A1* | 11/2014 | Andelman | C02F 1/4691 204/554 |
| 2015/0010784 A1 | 1/2015 | Takahata et al. | |

FOREIGN PATENT DOCUMENTS

| | | |
|---|---|---|
| JP | 2013-157154 A | 8/2013 |
| JP | 2013-175309 A | 9/2013 |
| JP | 2013-196798 A | 9/2013 |
| JP | 2014-011064 A | 1/2014 |
| JP | 2014-036010 A | 2/2014 |
| JP | 2014-086384 A | 5/2014 |
| WO | 2014/001898 A1 | 1/2014 |

* cited by examiner

FIG. 5

| | BATTERY CONFIGURATION ||||||||||| EVALUATION OF BATTERY CHARACTERISTICS |||||
| | POSITIVE ELECTRODE ||| NEGATIVE ELECTRODE || | | SPACE RATIO |||| OVERCHARGE TEST | HIGH-TEMPERATURE STORAGE TEST || BATTERY CAPACITY | SQUARE WAVE TEST |
| | CONDUCTIVE MATERIAL (g/cm³) | Vp (cm³) | Rp (vol%) | ORIENTATION RATIO I₁₁₀/I₀₀₄ | Vn (cm³) | Rn (vol%) | Vt (cm³) | Cr/Ct (vol%) | Vt/Cr | | INCREASE IN INTERNAL PRESSURE (MPa) | CID MALFUNCTION | CAPACITY RETENTION (%) | 100 Ah/L OR HIGHER | RESISTANCE INCREASE (%) |
| EXAMPLE 1 | 0.88 | 11.2 | 13.3 | 0.14 | 22.1 | 23 | 50 | 14.8 | 1.00 | | 0.8 | NONE | 92 | ○ | 8 |
| EXAMPLE 2 | 0.42 | 18.8 | 20.7 | 0.10 | 19.3 | 21 | 55 | 17.7 | 0.92 | | 0.7 | NONE | 89 | ○ | 10 |
| EXAMPLE 3 | 0.87 | 11.2 | 13.3 | 0.16 | 29.5 | 29 | 57 | 17.2 | 0.99 | | 0.8 | NONE | 91 | ○ | 6 |
| EXAMPLE 4 | 1.10 | 11.2 | 13.1 | 0.16 | 29.5 | 29 | 57 | 16.3 | 1.05 | | 0.9 | NONE | 94 | ○ | 6 |
| EXAMPLE 5 | 0.36 | 13.6 | 16.2 | 0.11 | 22.1 | 23 | 52 | 16.5 | 0.94 | | 0.7 | NONE | 81 | ○ | 8 |
| EXAMPLE 6 | 0.88 | 11.2 | 13.3 | 0.14 | 22.1 | 23 | 50 | 18.0 | 0.83 | | 0.6 | OCCURRED | 92 | ○ | 8 |
| EXAMPLE 7 | 0.88 | 11.2 | 13.3 | 0.11 | 22.1 | 23 | 48 | 13.2 | 1.09 | | 0.9 | OCCURRED | 92 | ○ | 8 |
| EXAMPLE 8 | 0.87 | 11.3 | 13.7 | 0.09 | 12.6 | 15 | 41 | 13.1 | 0.92 | | 0.7 | NONE | 92 | ○ | 24 |
| EXAMPLE 9 | 1.16 | 13.7 | 15.2 | 0.10 | 19.5 | 21 | 48 | 15.9 | 0.90 | | 1.0 | NONE | 93 | × | 10 |
| EXAMPLE 10 | 0.88 | 10.9 | 13.3 | 0.14 | 27.9 | 28 | 55 | 14.5 | 1.13 | | 0.9 | NONE | 94 | × | 7 |
| EXAMPLE 11 | 1.06 | 9.0 | 11.2 | 0.16 | 33.4 | 32 | 59 | 18.6 | 0.94 | | 1.0 | NONE | 94 | × | 7 |

NONAQUEOUS SECONDARY BATTERY HAVING HIGH VOLUME CAPACITY DENSITY

BACKGROUND OF THE INVENTION

1. Field of the Invention

The present invention relates to a secondary battery (nonaqueous secondary battery) including a nonaqueous electrolytic solution.

2. Description of Related Art

A nonaqueous secondary battery such as a lithium ion secondary battery has a small size, a light weight, and high energy density and thus is superior in output density. Therefore, a nonaqueous secondary battery has been preferably used as a so-called, portable power supply for a PC, a portable device, or the like or as a drive power supply for a vehicle.

Typically, such a battery is used in a state where the voltage is controlled to be in a predetermined region (for example, 3.0 V to 4.2 V). However, even when a higher current than usual is supplied to the battery due to malfunction or the like, the battery may be overcharged to higher than a predetermined voltage. During overcharge, gas may be produced by an electrolytic solution being decomposed, and the internal temperature of the battery may be increased by an active material generating heat. Therefore, as a safety mechanism for stopping the progress of overcharge, a pressure-operated current interrupt device (CID), which interrupts a charging current when the internal pressure of a battery case is a predetermined value or higher, is widely used.

Examples of the prior art documents relating to the CID include Japanese Patent Application Publication No. 2013-175309 (JP 2013-175309 A), Japanese Patent Application Publication No. 2013-157154, and Japanese Patent Application Publication No. 2013-196798. For example, JP 2013-175309 A discloses a nonaqueous secondary battery including a CID, in which an electrolytic solution contains a compound (hereinafter, also referred to as "gas producing agent") that produces gas at a predetermined battery voltage or higher, and a conductive material layer having a porosity of 35% to 55%, which is a reaction field of the gas producing agent, is provided between a positive electrode and a separator. According to this configuration, during overcharge, the gas producing agent can be caused to stably react (be decomposed) so as to produce gas. As a result, the internal pressure of a battery case can be rapidly improved, and the CID can be accurately operated.

According to the finding of the present inventors, the amount of gas required to operate a CID during overcharge (hereinafter, also referred to simply as "overcharge gas amount") may vary depending on the size of the remaining space in a battery case (that is, a volume obtained by subtracting the volume of an electrode body, an electrolytic solution, and auxiliary components such as a terminal from the internal volume of the battery case). For example, it is considered, under the same various conditions such as the setting of an operating pressure and the content of an electrolytic solution, the lower the remaining space volume in a battery case, the less the overcharge gas amount. However, when the remaining space in a battery case is excessively small, a CID is likely to malfunction, which is contradictory. That is, for example, during battery construction or normal use of a battery, an electrolytic solution or the like may be slightly decomposed so as to unexpectedly produce gas. As a result, a CID may malfunction.

In particular, it is required for a nonaqueous secondary battery having a high volume capacity density, which is used for a vehicle, to have a high level of both the battery capacity and the operating accuracy of a CID at the same time. That is, in the battery having a high volume capacity density, in order to increase the battery capacity per unit volume, it is necessary that the remaining space in a battery case be further decreased. Further, as the volume capacity density (in particular, the volume capacity density and the capacity) of a battery increases, it is necessary that, during overcharge, the progress of overcharge be accurately stopped by rapidly operating a CID. On the other hand, even when a battery for a vehicle is exposed to an environment such a high-temperature environment (for example, under a blazing sun) where an electrolytic solution or the like is likely to be decomposed, it is necessary to stop the malfunction of a CID at a high level.

SUMMARY OF THE INVENTION

The invention has been made to provide a highly reliable nonaqueous secondary battery having a high volume capacity density, the nonaqueous secondary battery including a pressure-operated current interrupt device (CID), in which the CID is not likely to malfunction during normal use and accurately operates during overcharge.

As a result of investigation of various aspects, the present inventors have concluded that, in order to solve the above-described problems, the optimization of a relationship between the pore volume in an electrode body, which is a reaction field of a gas producing agent, and the volume of a remaining space in a battery case is important. As a result of repeated investigation, the invention has been completed.

According to an aspect of the invention, there is provided a nonaqueous secondary battery having a high volume capacity density in which an initial capacity per unit volume is 100 Ah/L or higher. The nonaqueous secondary battery includes: an electrode body that includes a positive electrode including a positive electrode active material layer, a negative electrode including a negative electrode active material layer, and a separator interposed between the positive electrode and the negative electrode; a nonaqueous electrolytic solution containing a gas producing agent that is decomposed at higher than a predetermined battery voltage to produce gas; a battery case that accommodates the electrode body and the nonaqueous electrolytic solution together with auxiliary components; and a current interrupt device that operates when an internal pressure of the battery case is higher than a predetermined pressure. A ratio (Vt/Cr) of a pore volume Vt ($cm^3$) of the electrode body represented by the following equation (1) to a remaining space volume Cr ($cm^3$) in the battery case represented by the following equation (2) is 0.92 to 1.05. In other words, 0.92≤(Vt/Cr)≤1.05 is satisfied.

$$Vt = Vp + Vn + Vs \quad (1)$$

$$Cr = Ct - (Ce + Cna + Cc) \quad (2)$$

In the equation (1), Vt represents the pore volume of the electrode body, Vp represents an effective pore volume of the positive electrode active material layer, Vn represents an effective pore volume of the negative electrode active material layer, and Vs represents a pore volume of the separator. In addition, in the equation (2), Cr represents the remaining space volume in the battery case, Ct represents a volume of the battery case, Ce represents a volume of the electrode body (excluding a pore volume in the electrode body), Cna represents a volume of the nonaqueous electrolytic solution, and Cc represents a total volume of the auxiliary components accommodated in the battery case. The remaining space volume Cr (cm$^3$) in the battery case is 14.8 vol % or higher of the volume Ct (cm$^3$) of the battery case. In other words, 14.8≤(Cr/Ct)×100 is satisfied.

In the battery having the above-described configuration, the remaining space volume Cr is secured to be a predetermined ratio in the battery case. Therefore, even when gas is unexpectedly produced during battery construction or normal use of the battery, an increase in the internal pressure of the battery case can be suppressed. Accordingly, even when the battery is exposed to an environment where gas is likely to be unintentionally produced (for example, when the battery is stored in a high-temperature environment in a high SOC (State of Charge) for a long period of time), an increase in the internal pressure of the battery case is suppressed, and a malfunction of the CID can be prevented at a high level. In addition, in the battery having the above-described configuration, the pore volume Vt in the electrode body is secured to be appropriate relative to the remaining space volume Cr in the battery case. Therefore, during overcharge, a sufficient amount of overcharge gas can be produced to accurately operate the CID. Accordingly, in the battery having the above-described configuration, the operating accuracy of the CID is high, a malfunction of the CID is not likely to occur during normal use, and superior reliability and durability can be exhibited during overcharge.

In this specification, "effective pore volume" refers to the volume of pores which function as reaction fields of the gas producing agent during overcharge (typically, the volume of pores between secondary particles of an active material). More specifically, the effective pore volume is obtained by subtracting the volume of pores (unnecessary pores), which do not function as reaction fields of the gas producing agent, from the total pore volume in the active material layer, in which the volume of the unnecessary pores is measured based on mercury intrusion porosimetry. Here, the reason for defining "effective pore volume" without using the more commonly-used total pore volume is as follows: as a result of investigation, the present inventors have found that a relatively large amount (not negligible) of pores in an electrode do not function as reaction fields of a gas producing agent. In other words, in order to accurately operate the CID by causing a sufficient amount of overcharge gas to be produced during overcharge, it is necessary that only the volume of pores which function as reaction fields of the gas producing agent be strictly calculated. Specific methods of calculating "total pore volume" and calculating "unnecessary pore volume" based on "mercury intrusion porosimetry" will be described below in detail.

An effective porosity Rn of the negative electrode active material layer may be 23 vol % to 29 vol %. As a result, a conductive path in the negative electrode active material layer can be favorably maintained. Further, a sufficient amount of the nonaqueous electrolytic solution can be secured in the negative electrode active material layer. For example, even when high-rate charging and discharging is repeated within a short period of time, liquid shortage in the negative electrode active material layer can be prevented. Accordingly, not only high reliability but also superior battery performance (for example, high output density) can be realized. In this specification, "effective porosity" is a ratio (vol %) which is calculated by dividing the effective pore volume by an apparent volume of the active material layer to obtain a value and then multiplying the obtained value by 100. The apparent volume of the active material layer can be calculated as a product of the area (cm$^2$) in a plan view and the thickness (cm). Specifically, first, an electrode as a measurement object is cut out to a square shape or a rectangular shape using a punching machine, a cutter, or the like. Next, the area (cm$^2$) of an active material layer portion of the cut electrode in a plan view is measured. Next, the thickness (cm) of the active material layer portion is measured using a micrometer or a thickness meter. By multiplying these values, the apparent volume can be calculated.

The positive electrode active material layer may contain a conductive material. A content (g) of the conductive material per unit effective pore volume of the positive electrode active material layer may be 0.87 g/cm$^3$ to 1.1 g/cm$^3$. As a result, a conductive path in the positive electrode active material layer can be more strongly and favorably maintained. As a result, not only high reliability but also superior battery performance (for example, high-temperature storage characteristics) can be realized. The content of the conductive material per unit effective pore volume of the positive electrode active material layer can be calculated by dividing the content (g) of the conductive material in the positive electrode active material layer by the effective pore volume Vp (cm$^3$) of the positive electrode active material layer.

The negative electrode active material layer may contain a graphite-based carbon material. A ratio ($I_{110}/I_{004}$) of a peak intensity $I_{110}$ of a (110) plane to a peak intensity $I_{004}$ of a (004) plane based on X-ray crystal structure analysis of the negative electrode active material layer is 0.14 to 0.16. As a result, liquid shortage or unevenness in salt concentration can be prevented in the negative electrode active material layer. Accordingly, not only high reliability but also superior battery characteristics (for example, high output density) can be realized. "Graphite-based carbon material" is a collective term for a carbon material containing only graphite and a carbon material containing 50 mass % or more (typically 80 mass % or more; for example, 90 mass % or more) of graphite with respect to the total mass of the carbon material. In addition, the peak intensity ratio ($I_{110}/I_{004}$) of the negative electrode active material layer can be obtained with an X-ray diffractometer (XRD) using CuKα rays. Specifically, first, a negative electrode sheet including negative electrode active material layer is cut out as a measurement object. Next, an XRD chart is obtained by performing XRD measurement on the negative electrode sheet, and a diffraction peak intensity $I_{110}$ of a (110) plane and a diffraction peak intensity $I_{004}$ of a (004) plane are obtained from the XRD chart. By dividing $I_{110}$ by $I_{004}$, the peak intensity ratio ($I_{110}/I_{004}$) can be obtained.

The negative electrode active material layer may contain spherical graphite obtained by spheroidizing a graphite-based carbon material. According to the investigation by the present inventors, when spherical graphite is used, a large number of pores are present in the spherical graphite, and thus the volume of pores which do not function as reaction fields of the gas producing agent (the volume of unnecessary pores) tends to relatively increase. Accordingly, the application of the invention in which the pore volume in the electrode body is defined based on the effective pore volume is more efficient.

The gas producing agent may contain a compound having a biphenyl structure or cycloalkylbenzene. In particular, the gas producing agent may contain biphenyl and/or cyclohexylbenzene. These compounds are likely to have a conjugated system, in which electrons are easily transferred. Therefore, a large amount of gas can be rapidly produced during overcharge. In addition, the addition of an excessively large amount of gas producing agent may cause an increase in battery resistance. Therefore, in consideration of battery characteristics during normal use, the content of the gas producing agent may be adjusted to be 5 mass % or lower with respect to 100 mass % of the nonaqueous electrolytic solution.

As described above, in the nonaqueous secondary battery (for example, a lithium ion secondary battery), the battery capacity is high, and the operating accuracy of the CID is high. For example, even when the nonaqueous secondary battery is stored in a severe environment (for example, in a high-temperature environment) for a long period of time, the CID is not likely to malfunction and can be rapidly operated during overcharge. Accordingly, due to the above-described characteristics, the nonaqueous secondary battery can be used in an apparatus (for example, a power source (drive power supply) for driving a vehicle-mounted motor) in which high durability and reliability are required in a wide temperature range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table showing a battery configuration and the results of evaluating battery characteristics regarding each positive electrode active material layer of Examples 1 to 11;

DETAILED DESCRIPTION OF EMBODIMENTS

Figure 1:
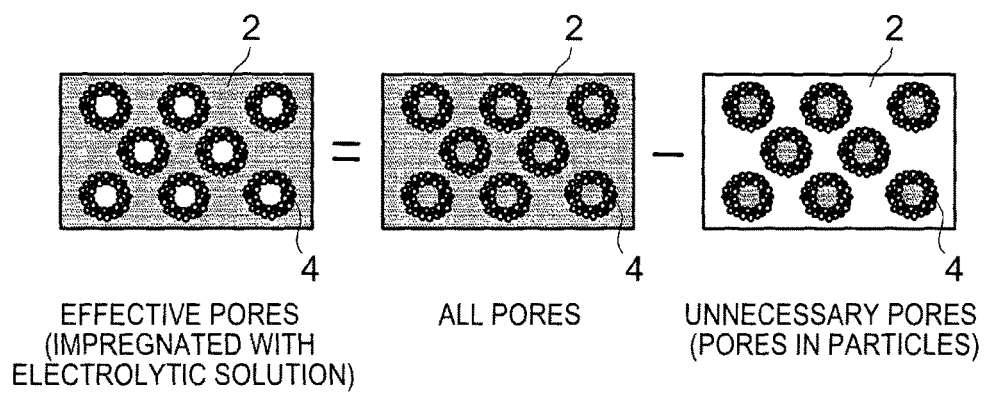
FIG. 1 is a schematic diagram showing differences between pores in an active material layer.

Preferred embodiments of the invention are described below. Matters (for example, components or a general manufacturing process of a battery which is not a characteristic of the invention) necessary to practice this invention other than those specifically referred to in this description may be understood as design matters based on the related art in the pertinent field for a person of ordinary skills in the art. The invention can be practiced based on the contents disclosed in this description and common technical knowledge in the subject field.

<Nonaqueous Secondary Battery>

A nonaqueous secondary battery according to an embodiment of the invention includes: an electrode body that includes a positive electrode, a negative electrode, and a separator; a nonaqueous electrolytic solution containing a gas producing agent; a battery case; and a pressure-operated current interrupt device (CID). A ratio (Vt/Cr) of a sum Vt ($cm^3$) of pore volumes in the electrode body to a remaining space volume Cr ($cm^3$) in the battery case is controlled so as to satisfy $0.92 \leq (Vt/Cr) \leq 1.05$, and the remaining space volume Cr ($cm^3$) in the battery case is 14.8 vol % or higher of the volume Ct ($cm^3$) of the battery case. Accordingly, the other configurations are not particularly limited and can be arbitrarily determined for various applications. Hereinafter, the respective components will be sequentially described.

The electrode body of the nonaqueous secondary battery includes a positive electrode, a negative electrode, and a separator. The electrode body has a volume Ce ($cm^3$) which is a sum of a volume of the positive electrode, a volume of the negative electrode, and a volume of the separator. Moreover, the electrode body also has a pore volume Vt ($cm^3$) which is a sum of an effective pore volume Vp of a positive electrode active material layer, an effective pore volume Vn of a negative electrode active material layer, and a pore volume Vs of the separator. The sum Vt of pore volumes in the electrode body is not particularly limited as long as it satisfies the above-described range of the Vt/Cr ratio but, typically, may be 50 $cm^3$ or more (for example, 52 $cm^3$ or more) and may be 60 $cm^3$ or less (for example, 57 $cm^3$ or less)

Typically, the positive electrode includes a positive electrode current collector and a positive electrode active material layer attached onto the positive electrode active material layer. As the positive electrode current collector, a conductive member formed of highly conductive metal (for example, aluminum or nickel) is preferably used.

Plural micropores are formed on the positive electrode active material layer. The nonaqueous electrolytic solution containing the gas producing agent is impregnated into the pores. During normal use, the battery is charged and discharged by charge carriers moving between the positive and negative electrodes through the nonaqueous electrolytic solution impregnated into the pores. In addition, during overcharge, the gas producing agent in the nonaqueous electrolytic solution is oxidized and decomposed on the surface of the positive electrode active material layer to produce hydrogen ions ($H^+$). The hydrogen ions are reduced on the negative electrode to produce hydrogen gas. According to the present inventors, the pores in the positive electrode active material layer are classified into two kinds including: "effective pores" which function as the above-described charge carriers or reaction fields of the gas producing agent; and "unnecessary pores" which do not have such a function. In other words, the total pore volume in the positive electrode active material layer is expressed as the sum of the effective pore volume and the unnecessary pore volume.

The positive electrode active material layer includes at least a positive electrode active material. As the positive electrode active material, one kind or two or more kinds may be used among various known materials which can be used as a positive electrode active material of a nonaqueous secondary battery. Preferable examples of the positive electrode active material include layered or spinel type lithium composite metal oxides (for example, $LiNiO_2$, $LiCoO_2$, $LiMn_2O_4$, $LiFeO_2$, $LiNi_{0.33}Co_{0.33}Mn_{0.33}O_2$, $LiNi_{0.5}Mn_{1.5}O_4$, and $LiCrMnO_4$) and olivine type materials (for example, LiFePO$_4$). Among these, a lithium nickel cobalt manganese composite oxide having a layered structure (typically, a layered rock-salt type structure) is preferably used from the viewpoints of heat stability and energy density.

Typically, the positive electrode active material has a form of a secondary particle (aggregate) obtained by causing small primary particles to aggregate. The characteristics of the positive electrode active material are not particularly limited. For example, the average particle size of secondary particles may be 20 μm or less (typically 0.1 μm to 20 μm; for example, 1 μm to 15 μm). The specific surface area may be 0.1 m$^2$/g or more (typically 0.5 m$^2$/g or more; for example, 1 m$^2$/g or more) and may be 5 m$^2$/g or less (typically 3 m$^2$/g or less; for example, 2 m$^2$/g or less). The tap density may be 1 g/cm$^3$ or more (typically 1.5 g/cm$^3$ or more) and may be 3 g/cm$^3$ or less (typically 2.5 g/cm$^3$ or less). The DBP absorption number may be 20 mL/100 g or more (typically 30 mL/100 g or more) and may be 60 mL/100 g or less (typically 50 mL/100 g or less). According to the investigation by the present inventors, the characteristics of the positive electrode active material may have a large effect on the pore volume (for example, the effective pore volume Vp) of the positive electrode active material layer. In other words, the positive electrode active material satisfying one or two or more of the above-described characteristics can allow the effective pore volume Vp to be appropriately secured in the positive electrode active material layer. Therefore, a high level of infiltrating properties and conductivity (low resistance) of the nonaqueous electrolytic solution can be simultaneously obtained. As a result, during normal use, superior battery characteristics (substantially, output characteristics) can be exhibited. In addition, during overcharge, components (for example, the gas producing agent and the nonaqueous solvent) of the nonaqueous electrolytic solution can be rapidly oxidized and decomposed. At this time, the CID can be operated in the initial stage of overcharge.

In this specification, "average particle size" refers to a particle size (also referred to as "$D_{50}$ particle size" or "median size") corresponding to a cumulative value of 50% in order from the smallest particle size in a volume particle size distribution which is obtained by particle size distribution measurement based on a general laser diffraction laser scattering method. In this specification, "specific surface area" refers to a BET specific surface area which is obtained by analyzing the surface area using a BET method (for example, a one-point BET method), the surface area being obtained with a constant-volume adsorption method using nitrogen gas. In this specification, "tap density" refers to a value which is obtained by measurement using a general tapped density meter according to JIS K 1469 (2003). In this specification, "DBP absorption number" refers to a value which is obtained by measurement according to JIS K 6217-4 (2008) "Carbon Black for Rubber Industry-Fundamental Characteristics-Part 4: Determination of DBP Absorption Number", in which a general absorption number measuring device is used, and DBP (dibutylphthalate) is used as a reagent liquid.

In addition to the positive electrode active material, the positive electrode active material layer may optionally contain one material or two or more materials which can be used as components of a positive electrode active material layer in a general nonaqueous secondary battery. Examples of the material include a conductive material and a binder. As the conductive material, for example, carbon materials such as various carbon blacks (for example, acetylene black and Ketjen black), activated carbon, graphite, and carbon fiber can be preferably used. In addition, as the binder, for example, vinyl halide resins such as polyvinylidene fluoride (PVdF) or polyalkylene oxides such as polyethylene oxide (PEO) can be preferably used. In addition, the positive electrode active material layer may further contain various additives (for example, an inorganic compound that produces gas during overcharge, a dispersant, or a thickener) within a range where the effects of the invention do not significantly deteriorate. In a preferred embodiment, the positive electrode active material layer contains a conductive material. As a result, the resistance of the positive electrode active material layer can be reduced. For example, even when high-rate charging and discharging is repeated, superior output characteristics can be realized.

The volume of the positive electrode can be obtained as the sum of "the volume of the positive electrode current collector" and "the volume of the positive electrode active material layer", that is, as the sum of the apparent volume of the positive electrode current collector and the total volume of constituent materials of the positive electrode active material layer. "The volume of the positive electrode current collector" can be measured using the same method as described in "the apparent volume of the active material layer". For example, when the positive electrode active material layer contains an active material, a conductive material, and a binder as constituent materials, "the volume of the positive electrode active material layer" can be obtained from the following equation.

Volume of Positive Electrode Active Material Layer=(Mass (g) of Positive Electrode Active Material/True Specific Gravity (g/cm$^3$) of Positive Electrode Active Material)+(Mass (g) of Conductive Material/True Specific Gravity (g/cm$^3$) of Conductive Material)+(Mass (g) of Binder/True Specific Gravity (g/cm$^3$) of Binder)

The true specific gravity of each material can be measured using a density meter according to a general constant volume dilatometric method (gas displacement pycnometry).

Figure 2:
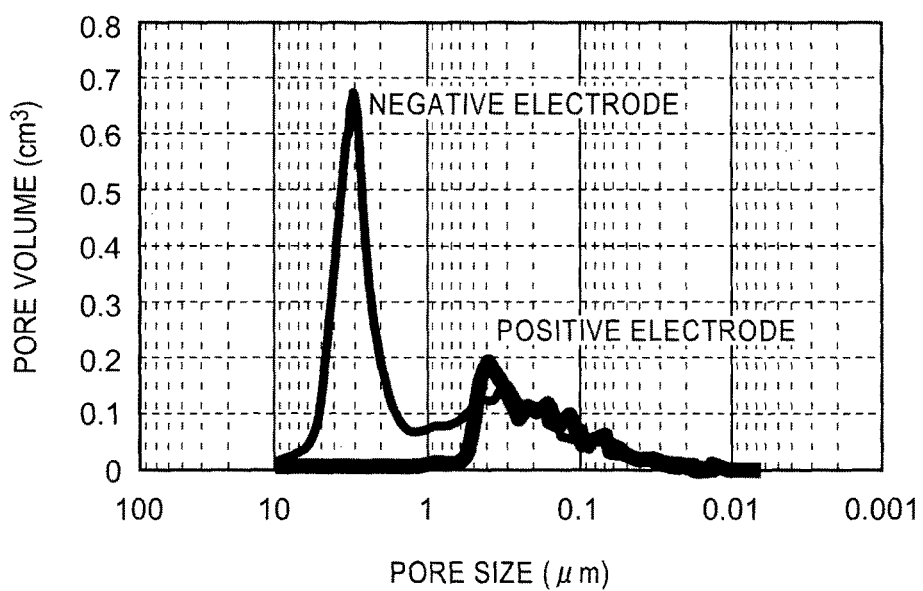
FIG. 2 is a pore distribution (chart) of an electrode based on mercury intrusion porosimetry according to a test example.

As described above, the effective pores and the unnecessary pores are present together in the positive electrode active material layer. Therefore, as shown in FIG. 1, only the effective pore volume Vp (black portions) is obtained by subtracting the unnecessary pore volume (black portions; typically, the volume of pores in secondary particles 4 of an active material) from the total pore volume (black portions) in an active material layer 2. As a result, the reaction field during overcharge can be appropriately controlled, and the CID can be accurately operated during overcharge. The total pore volume in the positive electrode active material layer can be obtained by subtracting "the volume of the positive electrode active material layer" (the total volume of constituent materials of the positive electrode active material layer) from "the apparent volume of the positive electrode active material layer" which is obtained using the above-described method. In addition, the volume of "the unnecessary pores" can be obtained as follows. That is, first, materials such as a positive electrode active material are kneaded in a solvent to prepare a positive electrode slurry. A surface of the positive electrode current collector is coated with this positive electrode slurry and dried. Next, the positive electrodes are pressed at various different pressures where particles of the positive electrode active material are not excessively crushed. As a result, samples which are different only in the density of the positive electrode active material layer are prepared. Next, the pore distributions of the positive electrode active material layers are measured based on mercury intrusion porosimetry. FIG. 2 is a pore distribution (chart) of a positive electrode according to a test example. In the example shown in FIG. 2, a peak having the maximum pore volume is shown at around 0.4 μm, and a broad peak is shown in a region of 0.2 μm or less. In a case where the pore distributions of the samples having different densities are measured using the same method, as the density of the sample increases, the peak having the maximum pore volume is shifted to the right (that is, a small pore size side) in FIG. 2. On the other hand, the position of the broad peak is not substantially shifted. Therefore, the pore volume of a peak region, where the pore size is not changed even when the density of the positive electrode active material layer is changed, can be considered as the volume of "the unnecessary pores". For example, in FIG. 2, the volume of pores having a pore size of 0.2 μm or less can be considered as the volume of the unnecessary pores. In the example of FIG. 2, a ratio of the volume of the unnecessary pores to the total pore volume is approximately 0.4 to 0.5.

Here, typically, the positive electrode active material as a major component of the positive electrode active material layer has a form of a secondary particle which is an aggregate of small primary particles. Therefore, it is considered that, among all the pores in the positive electrode active material layer, "the effective pores" are substantially derived from pores between secondary particles of the positive electrode active material, and "the unnecessary pores" are substantially derived from pores in the secondary particles of the positive electrode active material. According to the investigation by the present inventors, basically, the nonaqueous electrolytic solution is not impregnated into the pores in the secondary particles. In addition, during overcharge, a polymer film containing components derived from the gas producing agent may be formed on the surfaces of the secondary particles along with the oxidation decomposition of the gas producing agent. Accordingly, even when the gas producing agent is oxidized and decomposed to produce hydrogen ions by the nonaqueous electrolytic solution being impregnated into the pores in the secondary particles, the diffusion of the hydrogen ions is inhibited due to the polymer films of the secondary particles and does not reach the negative electrode. That is, it is considered that the pores in the secondary particles (unnecessary pores) do not function as effective reaction fields during overcharge and do not contribute to gas production. According to the investigation by the present inventors, the effective pore volume Vp of the positive electrode active material layer can be stably controlled by adjusting the characteristics (for example, average particle size) of the positive electrode active material and the characteristics (for example, density) of the positive electrode active material layer.

A ratio of the mass of the positive electrode active material to the total mass of the positive electrode active material layer may be suitably about 60 mass % or more (typically, about 70 mass % to 95 mass %) from the viewpoint of realizing a high volume capacity density of 100 Ah/L or higher. In addition, when the conductive material is used, a ratio of the mass of the conductive material to the total mass of the positive electrode active material layer may be, for example, about 1 mass % to 20 mass % (typically about 3 mass % to 10 mass %). According to the finding of the present inventors, in order to reduce battery resistance, the formation of a three-phase interface between the positive electrode active material, the conductive material, and a portion impregnated with the nonaqueous electrolytic solution (specifically, a charge carrier which is solvated with the nonaqueous electrolytic solution) is important. From this point of view, it is preferable that the content of the conductive material per unit effective pore volume (1 cm$^3$) of the positive electrode active material layer is defined. From the viewpoint of appropriately securing the electrical contact area between the positive electrode active material particles to prevent disconnection of a conductive path in the positive electrode active material layer, the content (g) of conductive material per unit effective pore volume may be 0.4 g/cm$^3$ or more (preferably 0.42 g/cm$^3$ or more and more preferably 0.87 g/cm$^3$ or more). In addition, from the viewpoint of realizing high energy density, it is preferable that the amount of the conductive material is as small as possible, and the content (g) of the conductive material per effective pore volume may be 1.5 g/cm$^3$ or less (preferably 1.1 g/cm$^3$ or less). As a result, a good conductive path can be stably secured in the positive electrode active material layer, and a battery having both high energy density and high input and output densities can be realized. In addition, when the binder is used, a ratio of the mass of the binder to the total mass of the positive electrode active material layer may be, for example, about 0.5 mass % to 10 mass % (typically, about 1 mass % to 5 mass %) from the viewpoint of securing mechanical strength (shape retaining ability).

The mass (coating weight) of the positive electrode active material layer per unit area of a single surface of the positive electrode current collector may be 3 mg/cm$^2$ or more (for example, 5 mg/cm$^2$ or more; typically 7 mg/cm$^2$ or more) from the viewpoint of realizing high energy density. From the viewpoint of realizing high output characteristics, the mass of the positive electrode active material layer per unit area of a single surface of the positive electrode current collector may be 100 mg/cm$^2$ or less (for example, 70 mg/cm$^2$ or less; typically 50 mg/cm$^2$ or less). In addition, the average thickness of the positive electrode active material layer per single surface may be, for example, 20 μm or more (typically 40 μm or more) and may be, for example, 100 μm or less (typically 80 μm or less). In addition, the density of the positive electrode active material layer may be, for example, 1.0 g/cm$^3$ or more (typically 1.5 g/cm$^3$ or more) and may be, for example, 4.5 g/cm$^3$ or less (typically 4.0 g/cm$^3$ or less). According to the investigation by the present inventors, the characteristics of the positive electrode active material layer such as the coating weight, thickness, and density may have a large effect on the pore volume (for example, the effective pore volume Vp). In other words, by appropriately adjusting these characteristics, the target effective pore volume Vp can be suitably secured in the positive electrode active material layer. As a result, the nonaqueous electrolytic solution can be sufficiently impregnated into the positive electrode active material layer. As a result, the reaction field with charge carriers can be widely secured, and high input and output characteristics can be exhibited during normal use. In addition, during overcharge, a large amount of gas can be rapidly produced. At this time, the CID can be accurately operated. Further, the mechanical strength (shape retaining ability) of the positive electrode active material layer can be suitably secured, and superior cycle characteristics can be realized. The density of the positive electrode active material layer can be obtained by dividing the mass (g) of the positive electrode active material layer by the apparent volume (cm$^3$) of the positive electrode active material. Accordingly, in the calculation of the density of the positive electrode active material layer, the unnecessary pores are also counted as the pores.

Typically, the negative electrode includes a negative electrode current collector and a negative electrode active material layer attached onto the negative electrode active material layer. As the negative electrode current collector, a conductive member formed of highly conductive metal (for example, copper or nickel) is preferably used. As in the case of the positive electrode active material layer, plural micropores are formed on the negative electrode active material layer. During normal use, the battery is charged and discharged by charge carriers moving between the positive and negative electrodes through the nonaqueous electrolytic solution impregnated into the pores. In addition, during overcharge, hydrogen ions ($H^+$) produced from the positive electrode are reduced on the surface of the negative electrode active material layer so as to produce hydrogen gas. According to the present inventors, as in the case of the pores present in the positive electrode active material layer, all the pores in the negative electrode active material layer are classified into two kinds pores including: "the effective pores" substantially derived from pores between secondary particles of the negative electrode active material; and "the unnecessary pores" substantially derived from pores in the secondary particles of the negative electrode active material. In other words, the total pore volume in the negative electrode active material layer is expressed as the sum of the effective pore volume and the unnecessary pore volume.

The negative electrode active material layer includes at least a negative electrode active material. As the negative electrode active material, one kind or two or more kinds may be used among various known materials which can be used as a negative electrode active material of a nonaqueous secondary battery. Preferable examples of the negative electrode active material include various carbon materials such as graphite, non-graphitizable carbon (hard carbon), graphitizable carbon (soft carbon), carbon nanotube, and a carbon material having a combination thereof; metal oxide materials such as lithium titanium composite oxide (LTO); and metal nitride materials such as lithium cobalt composite nitride or lithium nickel composite nitride. Among these, from the viewpoint of energy density, a graphite-based carbon material (for example, a carbon material containing 50 mass % or more of graphite with respect to the total mass of the negative electrode active material) is preferable.

In a preferred embodiment, the negative electrode active material layer contains a graphite-based carbon material, and the peak intensity ratio ($I_{110}/I_{004}$) of the peak intensity $I_{110}$ to the peak intensity $I_{004}$ based on X-ray crystal structure analysis of the negative electrode active material layer is 0.1 or higher (preferably 0.14 or higher; for example, 0.14 to 0.16). In general, it can be said that the lower the peak intensity ratio, the higher the orientation of the negative electrode active material layer. When $I_{110}/I_{004}$ is lower than 0.1, anisotropy occurs in an expanding direction during charge, and the negative electrode active material layer may be largely expanded or shrunk in a laminating direction (direction opposite to the' positive electrode). As a result, even when the discharge amount of the nonaqueous electrolytic solution is large, liquid shortage or unevenness in the concentration of a supporting electrolyte is likely to occur in the negative electrode active material layer. In the above-described range, the above-described problems can be prevented in advance.

Typically, the negative electrode active material has a form of a secondary particle (aggregate) obtained by causing small primary particles to aggregate. The characteristics of the negative electrode active material are not particularly limited. For example, the average particle size of secondary particles may be 50 μm or less (typically 1 μm to 30 μm; for example, 5 μm to 20 μm). The specific surface area may be 1 $m^2/g$ or more (typically 2 $m^2/g$ or more; for example, 3 $m^2/g$ or more) and may be 10 $m^2/g$ or less (typically 7 $m^2/g$ or less; for example, 5 $m^2/g$ or less). The tap density may be 0.5 $g/cm^3$ or more (typically 0.8 $g/cm^3$ or more) and may be 1.5 $g/cm^3$ or less (typically 1 $g/cm^3$ or less). The DBP absorption number may be 40 mL/100 g or more (typically 100 mL/100 g or more) and may be 300 mL/100 g or less (typically 200 mL/100 g or less). According to the investigation by the present inventors, the characteristics of the negative electrode active material may have a large effect on the pore volume (for example, the effective pore volume Vn) of the negative electrode active material layer. In other words, the negative electrode active material satisfying one or two or more of the above-described characteristics can allow the effective pore volume Vn to be appropriately secured in the negative electrode active material layer. Therefore, a high level of infiltrating properties and conductivity (low resistance) of the nonaqueous electrolytic solution can be simultaneously obtained.

The negative electrode active material having the above-described characteristics may have shape anisotropy and may have a shape such as a flaky shape or a flat shape. Alternatively, spherical graphite may be used, which is obtained by applying stress to a flaky graphite-based carbon material to be spheroidized. Since the spherical graphite has a fold structure in which an edge surface is folded, the unnecessary pore volume (typically, the volume of pores in the secondary particles of the negative electrode active material) tends to increase. Accordingly, the application of the invention to the spherical graphite is more efficient. Further, the orientation of a hexagonal net structure is made to be uniform by spheroidizing, and for example, the conductivity of the negative electrode active material layer in the thickness direction can be improved. Accordingly, the resistance can be further reduced, which is preferable.

In addition to the negative electrode active material, the negative electrode active material layer may optionally contain one material or two or more materials which can be used as components of a negative electrode active material layer in a general nonaqueous secondary battery. Examples of the material include a binder and various additives. As the binder, for example, polymer materials such as styrene-butadiene rubber (SBR), polyvinylidene fluoride (PVdF), and polytetrafluoroethylene (PTFE) can be preferably used. Moreover, various additives such as a thickener, a dispersant, or a conductive material can be appropriately used. For example, as the thickener, carboxymethyl cellulose (CMC) or methyl cellulose (MC) is preferably used.

The volume of the negative electrode can be obtained as the sum of "the volume of the negative electrode current collector" and "the volume of the negative electrode active material layer", that is, as the sum of the apparent volume of the negative electrode current collector and the total volume of constituent materials of the negative electrode active material layer. "The volume of the negative electrode current collector" can be measured using the same method as described in "the apparent volume of the active material layer". For example, when the negative electrode active material layer contains a negative electrode active material, a binder, and a thickener as constituent materials, "the volume of the negative electrode active material layer" can be obtained from the following equation.

Volume of Negative Electrode Active Material Layer=(Mass (g) of Negative Electrode Active Material/True Specific Gravity ($g/cm^3$) of Negative Electrode Active Material)+(Mass (g) of Binder/True Specific Gravity ($g/cm^3$) of Binder)+(Mass (g) of Thickener/True Specific Gravity ($g/cm^3$) of Thickener)

The true specific gravity of each material can be measured using a density meter according to a general constant volume dilatometric method (gas displacement pycnometry).

In the negative electrode active material layer, as in the case of the positive electrode active material layer, the effective pores and the unnecessary pores are present together. Therefore, as shown in FIG. 1, only the effective pore volume Vn (black portions) is obtained by subtracting the unnecessary pore volume (black portions; typically, the volume of pores in secondary particles 4 of an active material) from the total pore volume (black portions) in the active material layer 2. As a result, the reaction field during overcharge can be appropriately controlled, and the CID can be accurately operated during overcharge. The total pore volume in the negative electrode active material layer can be obtained by subtracting "the volume of the negative electrode active material layer" (the total volume of constituent materials of the negative electrode active material layer) from "the apparent volume of the negative electrode active material layer" which is obtained using the above-described method. In addition, the volume of the unnecessary pores can be obtained using the same method as described in the positive electrode active material layer. FIG. 2 is a pore distribution (chart) of a negative electrode according to a test example. In the example shown in FIG. 2, a peak having the maximum pore volume is shown at around 3 μm, and a broad peak is shown in a region of 1 μm or less. When the same investigation as that of the positive electrode active material layer is performed, for example, in FIG. 2, the volume of pores having a pore size of 1 μm or less can be considered as the volume of the unnecessary pores. In the example of FIG. 2, a ratio of the volume of the unnecessary pores to the total pore volume is increased to be approximately 0.4.

As long as the equation (1) is satisfied, the effective pore volume Vn of the negative electrode active material layer is not particularly limited, but may be 15cm$^3$ or more (typically 20 cm$^3$ or more; for example, 22.1 cm$^3$ or more) and may be 40 cm$^3$ or less (typically 30 cm$^3$ or less; for example, 29.5 cm$^3$ or less). According to the investigation by the present inventors, the effective pore volume Vn can be stably controlled by adjusting, for example, the characteristics (for example, average particle size) of the negative electrode active material and the characteristics (for example, density) of the negative electrode active material layer. In addition, when being calculated by dividing the effective pore volume Vn of the negative electrode active material layer by the apparent volume Va of the negative electrode active material layer to obtain a value and then multiplying the obtained value by 100 (that is Vn/Va×100), the effective porosity Rn may be, for example, 20 vol% or more (preferably 21vol% or more and more preferably 23 vol% or more) and may be 30 vol% or less (preferably 29vol% or less). In general, the nonaqueous electrolytic solution in the effective pores is pushed out from the pores by the expansion of the active material during charge. During discharge, the remaining nonaqueous electrolytic solution is collected by suction, and the impregnated state of the nonaqueous electrolytic solution is maintained. Therefore, when Rn is excessively low, the nonaqueous electrolytic solution is not impregnated into the inside of the negative electrode active material layer, and liquid shortage may occur. Alternatively, while the storage and release of charge carrier ions are repeated, the concentration of a supporting electrolyte in the negative electrode active material layer may become uneven. Further, during overcharge, the contact area between hydrogen ions and the negative electrode surface is decreased, and thus a reduction reaction may become slow or gas production may become slow. On the other hand, when Rn is excessively high, a conductive path in the negative electrode active material layer is disconnected, and thus the resistance may increase, or the mechanical strength (shape retaining ability) may be insufficient. In the above-described range, the nonaqueous electrolytic solution is suitably impregnated into the negative electrode active material layer, and during normal use, the target energy density and output density can be stably realized. In addition, during overcharge, the target overcharge gas amount can be stably obtained.

In addition, a ratio of the effective pore volume Vp of the positive electrode active material layer to the effective pore volume Vn of the negative electrode active material layer may be, for example, about 1.0:0.9 to 1.0 to 2.3. As a result, the positive and negative electrodes are well-balanced, and thus higher battery characteristics (for example, high output density) can be exhibited during normal use. In addition, during overcharge, the production of hydrogen ions in the positive electrode and the reduction of hydrogen ions in the negative electrode are efficiently performed, and thus the CID can be operated in the early stage.

A ratio of the mass of the negative electrode active material to the total mass of the negative electrode active material layer may be suitably about 60 mass % or more (typically, about 90 mass % to 98 mass %; for example, 95 mass % to 99 mass %) from the viewpoint of realizing a high volume capacity density of 100 Ah/L or higher. When the binder is used, a ratio of the mass of the binder to the total mass of the negative electrode active material layer may be, for example, about 1 mass % to 10 mass % (typically, about 1 mass % to 5 mass %) from the viewpoint of securing mechanical strength (shape retaining ability). When the thickener is used, a ratio of the mass of the thickener to the total mass of the negative electrode active material layer may be, for example, about 1 mass % to 10 mass % (typically about 1 mass % to 5 mass %).

The mass (coating weight) of the negative electrode active material layer per unit area of a single surface of the negative electrode current collector may be 5 mg/cm$^2$ or more (typically 7 mg/cm$^2$ or more) and may be 20 mg/cm$^2$ or less (typically 15 mg/cm$^2$ or less) from the viewpoint of realizing high energy density and high output density. In addition, the thickness of the negative electrode active material layer per single surface may be, for example, 40 μm or more (typically 50 μm or more) and may be, for example, 100 μm or less (typically 80 μm or less). In addition, the density of the negative electrode active material layer may be, for example, 0.5 g/cm$^3$ or more (typically 1.0 g/cm$^3$ or more) and is, for example, 2.0 g/cm$^3$ or less (typically 1.5 g/cm$^3$ or less). According to the investigation by the present inventors, the characteristics of the negative electrode active material layer such as the coating weight, thickness, and density may have a large effect on the pore volume (for example, the effective pore volume Vn). In other words, by appropriately adjusting these characteristics, the target effective pore volume Vn can be suitably secured in the negative electrode active material layer. By satisfying one or two or more of the above-described characteristics, high battery characteristics (for example, low resistance) can be realized during normal use. In addition, during overcharge, hydrogen ions produced from the positive electrode can be suitably reduced, and a large amount of gas can be rapidly produced. The density of the negative electrode active material layer can be calculated using the same method as that of the positive electrode active material layer.

The separator interposed between the positive and negative electrodes is not particularly limited as long as it insulates the positive electrode active material layer and the negative electrode active material layer from each other and has a function of holding the nonaqueous electrolytic solution and a shutdown function. Preferable examples of the separator include a porous resin sheet (film) formed of a resin such as polyethylene (PE), polypropylene (PP), polyester, cellulose, or polyamide can be preferably used. Among these, a polyolefin-based porous resin sheet (for example, PE or PP) is preferable. The polyolefin-based porous resin sheet has a sufficiently low shutdown temperature of 80° C. to 140° C. (typically 110° C. to 140° C.), and thus can exhibit the shutdown function at an appropriate timing and can exhibit higher reliability and overcharge resistance.

The separator may have a single-layer structure or a structure in which two or more porous resin sheets having different materials and properties (for example, thickness or porosity) are laminated. As the multi-layer structure, for example, a three-layer structure (that is, a three-layer structure of PP/PE/PP) in which a polypropylene (PP) layer is laminated on both surfaces of a polyethylene (PE) layer is preferably used. In addition, the separator may be a heat-resistant separator including a porous heat resistance layer on a single surface or both surfaces (typically, a single surface) of the porous sheet. This heat resistance layer may be, for example, a layer containing an inorganic filler and a binder. As the inorganic filler, for example, alumina, boehmite, silica, titania, calcia, magnesia, zirconia, boron nitride, or aluminum nitride can be preferably used. The average thickness of the heat resistance layer is, for example, about 1 μm to 10 μm. According to the embodiment, small short-circuit in the positive and negative electrodes can be prevented at a high level, and thus superior durability (for example, high-temperature storage characteristics) can be realized.

The characteristics of the separator are not particularly limited. For example, the thickness may be 10 μm or more (typically 15 μm or more) and may be 40 μm or less (typically 30 μm or less; for example, 25 μm or less). By adjusting the thickness to be in the above-described range, ion permeability is further improved. In addition, the porosity of the separator may be, for example, 20 vol % to 90 vol % (typically 30 vol % to 80 vol %; preferably 40 vol % to 60 vol %). When a commercially available product is used as the separator, the nominal value of the manufacturer can be adopted as the porosity of the separator. In addition, the separator has a pore volume Vs (cm$^3$) which is obtained as a product of the apparent volume of the separator and the porosity (%) thereof. The pore volume Vs (cm$^3$) can be calculated by dividing the pore volume, which is measured based on mercury intrusion porosimetry, by the apparent volume to obtain a value and multiplying the obtained value by 100. In addition, the volume of the separator can be obtained by subtracting the pore volume Vs from the apparent volume.

Typically, the nonaqueous electrolytic solution of the nonaqueous secondary battery contains at least a supporting electrolyte and a gas producing agent in a nonaqueous solvent. The nonaqueous electrolytic solution is liquid at room temperature (for example, 25° C.) and, in a preferred embodiment, is usually liquid in a usage environment of a battery (for example, in an environment having temperature range of −30° C. to 60° C.). The volume (amount used) Cna of the nonaqueous electrolytic solution varies depending on, for example, the volume of the battery case but is not particularly limited. Typically, the volume Cna is more than the sum Vt of pore volumes in the electrode body and, for example, may be adjusted such that the remaining nonaqueous electrolytic solution is present in the bottom of the battery case to some extent. The volume Cna of the nonaqueous electrolytic solution can be obtained by dividing the mass (g) of the nonaqueous electrolytic solution by the true specific gravity (g/cm$^3$) of the nonaqueous electrolytic solution.

As the nonaqueous solvent, various organic solvents which can be used in a nonaqueous electrolytic solution of a general nonaqueous secondary battery, for example, carbonates, ethers, esters, nitriles, sulfones, and lactones can be used. Specific examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or two or more kinds can be appropriately used in combination. In a preferred embodiment, a mixed solvent of a high dielectric constant solvent and a low viscosity solvent can be used. By using this mixed solvent, the battery has high electric conductivity and can be used in a wide temperature range. For example, EC can be used as the high dielectric constant solvent, and DMC or EMC can be used as the low viscosity solvent. For example, the nonaqueous solvent may contain one kind or two kinds of carbonates, and the total volume of the carbonates is preferably 60 vol % or more (more preferably 75 vol % or more, still more preferably 90 vol % or more; may be substantially 100 vol %) with respect to the total volume of the nonaqueous solvent.

As the supporting electrolyte, one kind or two or more kinds can be selected from among those which can be used in a general nonaqueous secondary battery as long as it contains charge carrier ions (for example, lithium ions, sodium ions, or magnesium ions; in a lithium ion secondary battery, lithium ions). For example, lithium ions are used as the charge carrier ions, examples of the supporting electrolyte include lithium salts such as $LiPF_6$, $LiBF_4$, $LiClO_4$, $LiAsF_6$, $Li(CF_3SO_2)_2N$, and $LiCF_3SO_3$.

Among these supporting electrolytes, one kind can be used alone, or two or more kinds can be used in combination. As the supporting electrolyte, for example, $LiPF_6$ is particularly preferably used. In addition, the density of the supporting electrolyte is preferably 0.7 mol/L to 1.3 mol/L with respect to the total amount of the nonaqueous electrolytic solution.

Any compound can be used as the gas producing agent without any particular limitations as long as it is a compound that is decomposed at higher than a predetermined battery voltage to produce gas (that is, a compound that is decomposed to produce gas when an oxidation potential (vs. Li/Li$^+$) is higher than or equal to a charging upper limit potential (vs. Li/Li+) of the positive electrode, and when the battery is overcharged to higher than this potential). Specific examples of this compound include a compound having a biphenyl structure such as biphenyl or alkylbiphenyl, alkylbenzene, cycloalkylbenzene, an organic phosphorus compound, a fluorine-substituted aromatic compound, a carbonate, a cyclic carbamate, and an alicyclic hydrocarbon. For example, in a battery in which the charging upper limit potential (vs. Li/Li$^+$) of the positive electrode is set to be about 4.0 V to 4.2 V, biphenyl having an oxidation potential of about 4.5 V (vs. Li/Li$^+$) or cyclohexylbenzene having an oxidation potential of about 4.6 V (vs. Li/Li$^+$) is preferably used. Since these gas producing agents have an oxidation potential close to the charging upper limit potential, the positive electrode is oxidized and decomposed in the early stage of overcharge, and thus gas (typically hydrogen gas) can be rapidly produced. In another preferred embodiment, two or more kinds of compounds having different oxidation potentials are added. Due to the addition of two or more kinds of gas producing agents, a large amount of gas can be relatively continuously and stably produced during overcharge. As a result, the CID can be more accurately operated.

The addition amount of the gas producing agent in the nonaqueous electrolytic solution is not particularly limited, but may be 2 mass % or more (typically, 3 mass % or more; for example, 4 mass % or more) with respect to 100 mass % of the nonaqueous electrolytic solution from the viewpoint of securing a sufficient amount of gas for operating the CID. In the above-described range, during overcharge, a sufficient amount of gas can be produced, and the CID can be more accurately operated. However, the gas producing agent may function as a resistance component in a cell reaction during normal use. Therefore, when an excess amount of the gas producing agent is added, durability and input and output characteristics may deteriorate. In addition, for example, when the battery is stored in a high-temperature environment, the CID may malfunction. From this point of view, the addition amount of the gas producing agent may be 7 mass % or less (typically, 6 mass % or less; for example, 5 mass % or less). In the above-described range, the resistance can be suppressed during normal use, and high battery characteristics can be stably exhibited.

In addition to the above-described components, optionally, the nonaqueous electrolytic solution may further contain various additives within a range where the effects of the invention do not significantly deteriorate. These additives are used for one or two or more of the purposes including: improvement of the storability of the battery (prevention of a decrease in capacity during storage); improvement of cycle characteristics; improvement of an initial charge-discharge efficiency; and improvement of input and out performance. Specific examples of the additives include a film forming agent such as vinylene carbonate (VC), vinyl ethylene carbonate (VEC), or lithium bis(oxalato)borate (Li[B(C$_2$O$_4$)$_2$]); a dispersant; and a thickener.

The battery case of the nonaqueous secondary battery is a container that accommodates the electrode body and the nonaqueous electrolytic solution. The shape of the battery case (the external shape of the container) is typically a hexahedron shape (a rectangular shape or a cube shape) to realize high volume capacity density. However, the shape may be, for example, a cylindrical shape, a bag shape, and a shape obtained by processing and modifying the above-described shape. As a material of the battery case, a relatively light-weight metal (for example, aluminum or an aluminum alloy) can be preferably adopted from the viewpoint of, for example, improving heat dissipation and energy density.

Figure 3:
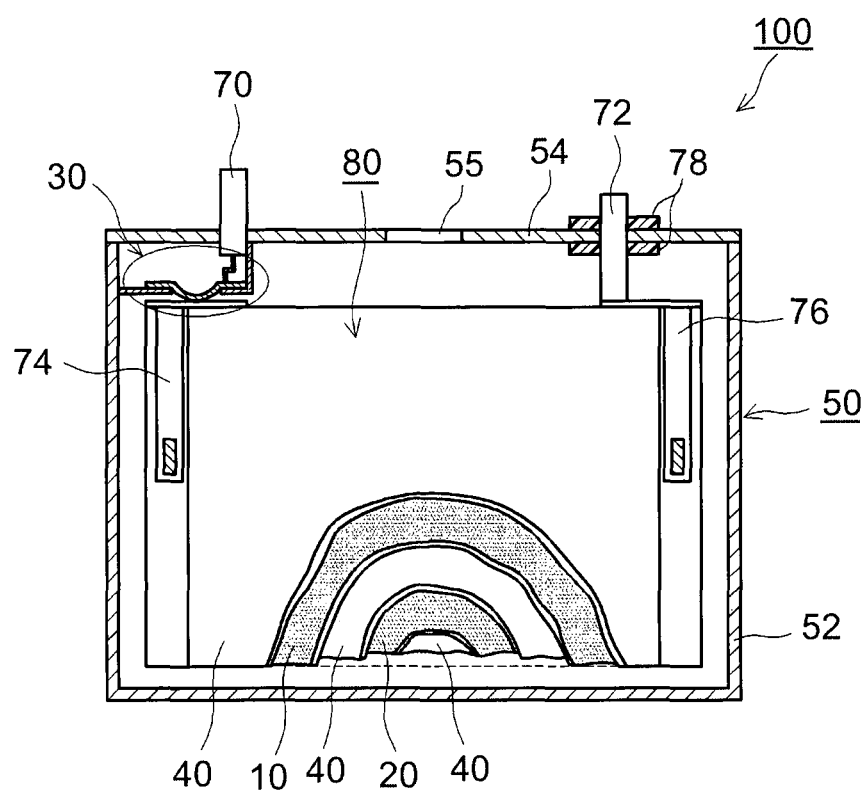
FIG. 3 is a vertical cross-sectional view schematically showing a nonaqueous secondary battery according to an embodiment of the invention.

The absolute size of the battery case is not particularly limited, and the battery case has the volume Ct (cm$^3$) in which a high capacity type of the electrode body and the nonaqueous electrolytic solution can be accommodated and the remaining space volume Cr (cm$^3$) can be appropriately secured. In other words, in the nonaqueous secondary battery, a ratio of the remaining space volume Cr to the volume Ct of the battery case is 14.8 vol % or higher and preferably 16.3 vol % or higher. As a result, during normal use, the malfunction of the CID can be prevented at a high level. In addition, from the viewpoint of realizing high energy density, a decrease in size, and the like, the ratio of the remaining space volume Cr may be 20 vol % or lower and preferably 18 vol % or lower. In this specification, "the volume of the battery case" refers to the accommodation volume (internal volume) of the battery case. For example, as shown in FIG. 3 described below, when the inside of the battery case is air-tightly separated into several spaces (for example, a main space that accommodates the electrode body and the nonaqueous electrolytic solution and a CID space that accommodates the CID), "the volume of the battery case" refers to the internal volume of only the main space. In addition, the volume of "the unnecessary pores" present in each of the positive and negative electrode active material layers is also counted as the remaining space volume Cr in the battery case.

Examples of the auxiliary components of the battery include terminals which electrically connect the positive and negative electrodes of the electrode body to an external device of the battery; an insulating spacer that maintains insulating properties between the terminals and the battery case; and a spacing plate (spacer) that is interposed between the electrode body and the battery case. A current collector terminal of the positive electrode is preferably formed of aluminum or an aluminum alloy, and a current collector terminal of the negative electrode is preferably formed of copper or nickel. The insulating spacer is preferably formed of a light-weight synthetic resin such as a polyolefin resin. The spacing plate may be adjusted such that the electrode body is not deviated from a predetermined accommodation position, or may be function as a heat dissipation member which dissipates heat generated in the battery. The spacing plate is preferably formed of a light-weight and hard synthetic resin such as polypropylene. The total volume of portions of the auxiliary components accommodated in the battery case is represented by Cc (cm$^3$).

In the embodiment, the ratio (Vt/Cr) of the sum Vt of pore volumes of the electrode body to the remaining space volume Cr in the battery case is adjusted to be in a predetermined range. From the viewpoint of rapidly operating the CID during overcharge, Vt/Cr is 0.92 or higher (for example, 0.99 or higher). In addition, from the viewpoint of obtaining a high level of battery capacity and overcharge resistance, Vt/Cr is 1.05 or lower.

In addition, the nonaqueous secondary battery includes a pressure-operated current interrupt device (that is, a CID that is operated due to an increase in the internal pressure of the battery case). According to the embodiment, the malfunction of the CID due to gas production can be prevented during normal use, and the CID can be accurately operated only during overcharge. Accordingly, the nonaqueous secondary battery having superior operating accuracy of the CID and high reliability can be realized.

The nonaqueous secondary battery according to the embodiment of the invention has a form in which the wound electrode body having a flat shape and the nonaqueous electrolytic solution are accommodated in the battery case having a flat rectangular shape, but the invention is not limited thereto. In addition, in the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

FIG. 3 is a vertical cross-sectional view schematically showing a cross-sectional structure of a nonaqueous secondary battery 100. In this nonaqueous secondary battery 100, an electrode body (wound electrode body) 80 and a nonaqueous electrolytic solution (not shown) are accommodated in a flat box-shaped battery case 50, the electrode body 80 having a configuration in which an elongated positive electrode sheet 10 and an elongated negative electrode sheet 20 are wounded flat with an elongated separator sheet 40 interposed therebetween.

The battery case 50 includes: a flat rectangular (box shape) battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. Around the negative electrode terminal 72, an insulating spacer 78 is provided so as to secure insulating properties between the negative electrode terminal 72 and the battery case 50 and to strongly fix the negative electrode terminal 72 to the battery case 50. As in the case of a battery case of a nonaqueous secondary battery in the related art, the lid 54 further includes a safety valve 55 for discharging gas, produced from the inside of the battery case 50, to the outside of the battery case 50. Further, in the battery case 50, a current interrupt device 30 that is operated due to an increase in the internal pressure is provided between the positive electrode terminal 70, fixed to the lid 54, and the wound electrode body 80. When the internal pressure of the battery case 50 increases, the current interrupt device 30 is configured to interrupt a charging current by disconnecting a conductive path ranging from at least one of the electrode terminals (that is, the positive electrode terminal 70 and/or the negative electrode terminal 72) to the wound electrode body 80. In this embodiment, when the internal pressure of the battery case 50 increases, the current interrupt device 30 is configured to disconnect a conductive path ranging from the positive electrode terminal 70 to the wound electrode body 80.

Figure 4:
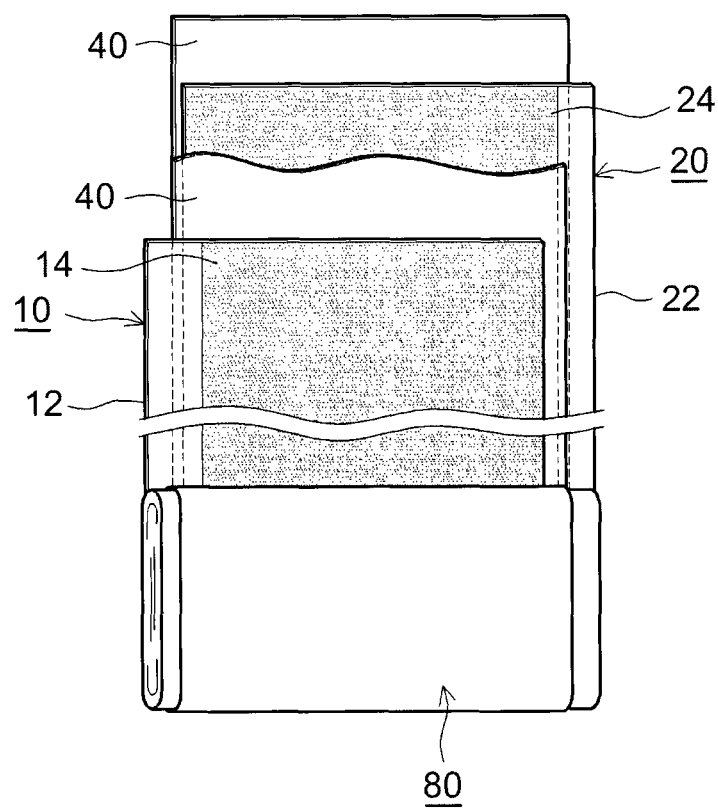
FIG. 4 is a schematic diagram showing a configuration of a wound electrode body according to an embodiment of the invention.

In the battery case 50, the flat wound electrode body 80, the spacing plates (not shown) between which a flat surface of the electrode body is interposed, and the nonaqueous electrolytic solution (not shown) are accommodated. FIG. 4 is a schematic diagram showing a configuration of the flat wound electrode body 80 shown in FIG. 3. This wound electrode body 80 has an elongated sheet structure (sheet-shaped electrode body) in a step before assembly. The positive electrode sheet 10 includes an elongated positive electrode current collector 12; and a positive electrode active material layer 14 that is formed on at least one surface (typically, on both surfaces) of the positive electrode current collector 12 in a longitudinal direction. The negative electrode sheet 20 includes an elongated negative electrode current collector 22; and a negative electrode active material layer 24 that is formed on at least one surface (typically, on both surfaces) of the negative electrode current collector 22 in a longitudinal direction. In addition, two separators (separator sheets) 40 having an elongated sheet shape are arranged between the positive electrode active material layer 14 and the negative electrode active material layer 24 as an insulating layer for preventing direct contact therebetween.

A winding core portion is formed in the center of the wound electrode body 80 in a width direction which is defined as a direction moving from one end portion to another end portion in the winding axial direction, the winding core portion having a configuration in which the positive electrode active material layer 14, which is formed on the surface of the positive electrode current collector 12, and the negative electrode active material layer 24, which is formed on the negative electrode current collector 22, overlap each other to be densely laminated. In addition, at opposite end portions of the wound electrode body 80 in the winding axial direction, a positive electrode active material layer non-forming portion of the positive electrode sheet 10 and a negative electrode active material layer non-forming portion of the negative electrode sheet 20 protrude from the winding core portion to the outside, respectively. A positive electrode current collector plate 74 is attached to the protrusion on the positive electrode side (that is, the positive electrode active material layer non-forming portion). A negative electrode current collector plate 76 is attached to the protrusion on the negative electrode side (that is, the negative electrode active material layer non-forming portion). Both the positive and negative electrode current collector plates are electrically connected to the positive electrode terminal 70 (FIG. 3) and the negative electrode terminal 72 (FIG. 3) described above, respectively.

<Application>

The embodiment is applied to a nonaqueous secondary battery having a high volume capacity density in which the battery capacity is 100 Ah/L or higher. Further, examples of preferable targets to which the embodiment is applicable include a high-capacity nonaqueous secondary battery having a theoretical capacity of 5 Ah or higher (for example, 10 Ah or higher, particularly, 20 Ah or higher) and, for example, 100 Ah or lower; and a nonaqueous secondary battery which can be used in a charging-discharging cycle in which high-rate charging and discharging is repeated at 5 C or higher (for example 5 C to 50 C), 10 C or higher, and particularly 20 C or higher (for example, 20 C to 50 C). By applying the configuration of the invention to the above-described battery, the malfunction of the CID can be prevented during normal use, and the reliability during overcharge (overcharge resistance) can be improved as compared to that of the related art. Further, in a preferred embodiment, for example, even when the battery is stored in a high-temperature for a long period of time, the capacity retention and high-temperature durability may be high. In another preferred embodiment, for example, even when high-rate charging and discharging is repeated within a short period of time, the resistance increase is suppressed, and the input and output characteristics are superior. Due to the above-described characteristics, the battery according to the embodiment can be suitably used as a power supply which is a driving source such as a motor for driving a vehicle. Accordingly, the nonaqueous secondary battery (which may have a form of a battery pack) according to the embodiment can be used in vehicles, for example, a plug-in hybrid vehicle (PHV), a hybrid vehicle (HV), an electric vehicle (EV), an electric truck, an electric scooter, an electric-assisted bicycle, an electric wheelchair, or an electric railway.

Hereinafter, several examples relating to the invention will be described, but the specific examples are not intended to limit the invention.

[Positive Electrode Sheet]

As a positive electrode active material, $LiNi_{0.33}Co_{0.33}Mn_{0.33}O_2$ (LNCM) having an average particle size of 6 μm was prepared. In Example 1, LNCM as a positive electrode active material; acetylene black (AB) as a conductive material; and polyvinylidene fluoride (PVdF) as a binder were put into a kneading machine such that a mass ratio (LNCM:AB:PVdF) of the materials was 90:8:2. The mixture was kneaded while adjusting the viscosity with a small amount of N-methylpyrrolidone (NMP). As a result, a positive electrode slurry was prepared. Both surfaces of elongated aluminum foil (positive electrode current collector) having a thickness of 15 μM were coated with the slurry such that the coating weight per single surface was 30 mg/cm². After removing the solvent component by drying, the aluminum foil was roll-pressed. As a result, a positive electrode sheet (density: 3.0 g/cm³) including a positive electrode active material layer on the positive electrode current collector was prepared. In Examples 2 to 11, positive electrode sheets were prepared by the same procedure as that of Example 1, except that the addition amount of the conductive material (AB) was increased or decreased; and roll-press conditions (a set pressure and a press time) were changed.

Regarding the positive electrode active material layer of each of the above-prepared positive electrodes (Examples 1 to 11), the total volume of constituent materials was subtracted from the apparent volume, and the obtained value was converted into the total pore volume of the entire positive electrode sheet used. In addition, the pore volume of the positive electrode active material layer was measured using a mercury porosimeter. A measuring device and measurement conditions are as follows.

Measuring device: Autopore III 9410 (manufactured by. Shimadzu Corporation)

Pressure range: 20 psi to 30,000 psi

From the obtained pore distribution (chart), as described above, the volume of pores having a pore size of 0.2 μm or less was calculated as the unnecessary pore volume (typically, the volume of pores in the secondary particles), and the obtained value was converted into the unnecessary pore volume of the entire positive electrode sheet used. The unnecessary pore volume was subtracted from the total pore volume to calculate the effective pore volume $V_p$ (cm³). The results are shown in the corresponding items of FIG. 5. In addition, the effective pore volume $V_p$ (cm³) was divided by the apparent volume $V_c$ (cm³) of the positive electrode active material layer, and the obtained value was multiplied by 100 to calculate the effective porosity $R_p$ (vol %). The results are shown in the corresponding items of FIG. 5. In addition, the amount (g) of the conductive material used was divided by the effective pore volume $V_p$ (cm³) of the positive electrode active material layer to calculate the amount (g/cm³) of the conductive material per unit effective pore volume. The results are shown in the corresponding items of FIG. 5.

[Negative Electrode Sheet]

As a negative electrode active material, spherical graphite (C) having an average particle size of 20 μm was prepared. In Example 1, the spherical graphite (C) as a negative electrode active material; styrene-butadiene rubber (SBR) as a binder; and carboxymethyl cellulose (CMC) as a thickener were put into a kneading machine such that a mass ratio (C:SBR:CMC) of the materials was 98:1:1. The mixture was kneaded while adjusting the viscosity with a small amount of ion exchange water. As a result, a negative electrode slurry was prepared. Both surfaces of elongated copper foil (negative electrode current collector) having a thickness of 10 μm were coated with the slurry such that the coating weight per-single surface was 15 mg/cm². After removing moisture by drying, the copper foil was roll-pressed. As a result, a negative electrode sheet (density: 1.4 g/cm³) including a negative electrode active material layer on the negative electrode current collector was prepared. In Examples 2 to 11, negative electrode sheets were prepared by the same procedure as that of Example 1, except that roll-press conditions (a set pressure and a press time) were changed.

Regarding the negative electrode active material layer of each of the negative electrodes (Examples 1 to 11), the total pore volume was calculated by the same procedure as that of the positive electrode active material layer. In addition, the pore volume of the negative electrode active material layer was measured using a mercury porosimeter. A measuring device and measurement conditions are the same as those of the measurement of the positive electrode active material layer. From the obtained pore distribution (chart), as described above, the volume of pores having a pore size of 1 μm or less was calculated as the unnecessary pore volume (typically, the volume of pores in the secondary particles), and the obtained value was converted into the unnecessary pore volume of the entire negative electrode sheet used. The unnecessary pore volume was subtracted from the total pore volume to calculate the effective pore volume $V_n$ (cm³). The results are shown in the corresponding items of FIG. 5. In addition, the effective pore volume $V_n$ (cm³) was divided by the apparent volume $V_a$ (cm³) of the negative electrode active material layer, and the obtained value was multiplied by 100 to calculate the effective porosity $R_n$ (vol %). The results are shown in the corresponding items of FIG. 5.

The orientation of each of the above-prepared negative electrodes (Examples 1 to 11) was measured using an X-ray diffractometer. A measuring device and measurement conditions are as follows. A peak intensity ratio ($I_{110}/I_{004}$) of a peak intensity $I_{110}$ of a (110) plane and a peak intensity $I_{004}$ of a (004) plane was calculated. The results are shown in the corresponding items of FIG. 5.

Measuring device: Ultima IV (manufactured by Rigaku Corporation)

Target: CuKα radiation, graphite monochromator)

Slit: Divergence slit=1°, light-receiving slit=0.1 mm, scattering slit=1°

[Nonaqueous Secondary Battery]

The positive electrode sheet and the negative electrode sheet prepared as described above were wound together with two separator sheets to prepare a flat wound electrode body. As the separator sheet, a commercially available product was used, the product having a three-layer structure in which polypropylene (PP) was laminated on both surfaces of polyethylene (PE). The total pore volume $V_s$ of the separator sheets was calculated as a product of the apparent volume and the porosity (nominal value of the manufacturer) Next, a positive electrode terminal and a negative electrode terminal were attached to a lid of a battery case, and these terminals were respectively welded to the positive electrode current collector and the negative electrode current collector which were exposed to end portions of the wound electrode body. The wound electrode body connected to the lid was put into the square battery case including a CID through an opening thereof, and the opening and the lid were welded. A nonaqueous electrolytic solution was injected through an electrolytic solution injection port provided on the lid. As the nonaqueous electrolytic solution, a solution was used in which $LiPF_6$ as a supporting electrolyte was dissolved in a mixed solvent at a concentration of 1.1 mol/L, the mixed solvent containing ethylene carbonate (EC), dimethyl carbonate (DMC), and ethyl methyl carbonate (EMC) at a volume ratio (EC:DMC:EMC) of 30:40:30. In addition, 4 mass % of cyclohexylbenzene (CHB) and 1 mass % of biphenyl (BP) as a gas producing agent were further dissolved in the mixed solvent.

In this way, nonaqueous secondary batteries (Examples 1 to 11) were constructed. The pore volume $V_t$ (cm³) of the electrode body was calculated from the following equation: Effective Pore Volume $V_p$ (cm³) of Positive Electrode Active Material Layer+Effective Pore Volume Vn (cm³) of Negative Electrode Active Material Layer+Pore Volume Vs (cm³) of Separator. In addition, the remaining space volume Cr (cm³) in the battery case was calculated from the following equation: Volume Ct (cm³) of Battery Case−Volume Ce (cm³) of Electrode Body−Volume Cna (cm³) of Nonaqueous Electrolytic Solution−Total Volume Cc (cm³) of Auxiliary Components Accommodated in Battery Case. Next, the values of Cr/Ct×100 (Vol %) and Vt/Cr were obtained. The results are shown in the corresponding items of FIG. 5.

[Activation]

In an environment of 25° C., the above-obtained battery was charged at a constant current (CC charging) of ⅓C such that the voltage between the positive and negative electrode terminals reached 3.95 V. Next, the battery was charged at a constant voltage (CV charging) such that the current value was 0.02 C. The charged battery was left to stand in a thermostatic chamber at a temperature of 60° C. for 24 hours to perform aging.

[Measurement of Initial Capacity]

In an environment of 25° C., the activated battery was discharged to 3.0 V at a constant current of 1 C and then was discharged at the constant voltage for 2.5 hours. Next, the battery was charged to 4.1 V at a constant current of 1 C and then was charged at the constant voltage for 2.5 hours. Next, the battery was discharged to 3.0 V at a constant current of ⅓ C and then was discharged at the constant voltage for 3 hours. At this time, the CCCV discharge capacity was set as the initial capacity (Ah). The obtained initial capacity was divided by the apparent volume of the battery case to calculate the capacity (Ah/L) per unit volume. The results are shown in the item "Battery Capacity" of FIG. 5. Here, a case where the capacity was 100 Ah/L or higher is represented by "O", and a case where the capacity was lower than 100 Ah/L is represented by "X". According to FIG. 5, the batteries of Examples 1 to 8 were high volume capacity density type batteries in which the volume capacity density (Ah/L) was 100 Ah/L or higher.

[Square Wave Test]

First, in an environment of 25° C., the battery was adjusted to SOC 20% and was discharged at a constant current of 10 C. The voltage drop during 10 seconds after the discharge was measured. The measured voltage drop value (V) was divided by the corresponding current value to calculate the initial IV resistance. Next, the battery was adjusted to SOC 80%. 10 seconds of pulse charging-discharging on the battery was repeated at a constant current of 5 C 1,000 times. After the pulse charge-discharge test, the IV resistance of the battery was calculated using the same method as that of the initial IV resistance. The resistance increase was calculated from the IV resistance after the pulse charge-discharge test and the initial IV resistance according to the following equation:

Resistance Increase (%)=(IV Resistance after Pulse Charge-Discharge Test−Initial IV Resistance)/ Initial IV Resistance×100.

The results are shown in the corresponding items of FIG. 5.

[High-Temperature Storage Test]

An internal pressure sensor was attached to the battery after the initial capacity measurement. Next, in an environment of 25° C., the battery was adjusted to SOC 85% and was stored in a thermostatic chamber at a temperature of 60° C. for 100 days. The battery capacity was measured using the same method as that of the initial capacity, and then the capacity retention was calculated according to the following equation:

Capacity Retention (%)=(Capacity after high-temperature storage test/Initial Capacity)×100.

The results are shown in the corresponding items of FIG. 5. In addition, an increase value of the internal pressure was read from the internal pressure sensor attached to the battery, and whether or not the CID malfunctioned was determined. The results are shown in the corresponding items of FIG. 5. Here, a case where it was determined that the CID was not likely to malfunction is represented by "O", and a case where it was determined that the CID was likely to malfunction due to a large amount of gas produced is represented by "X".

[Overcharge Test]

A battery including no CID having the same configurations as those of the battery including the CID was constructed. Regarding this battery, an increase in internal pressure during overcharge was investigated. That is, the initial capacity was measured using the same method as described above, and an internal pressure sensor was attached to the battery. In an environment of 25° C., the battery was adjusted to SOC 100% (full charge). When the battery was compulsorily charged to SOC 150%, an increase (MPa) in internal pressure was measured. The results are shown in the corresponding items of FIG. 5 and FIG. 6A.

Figure 6A:
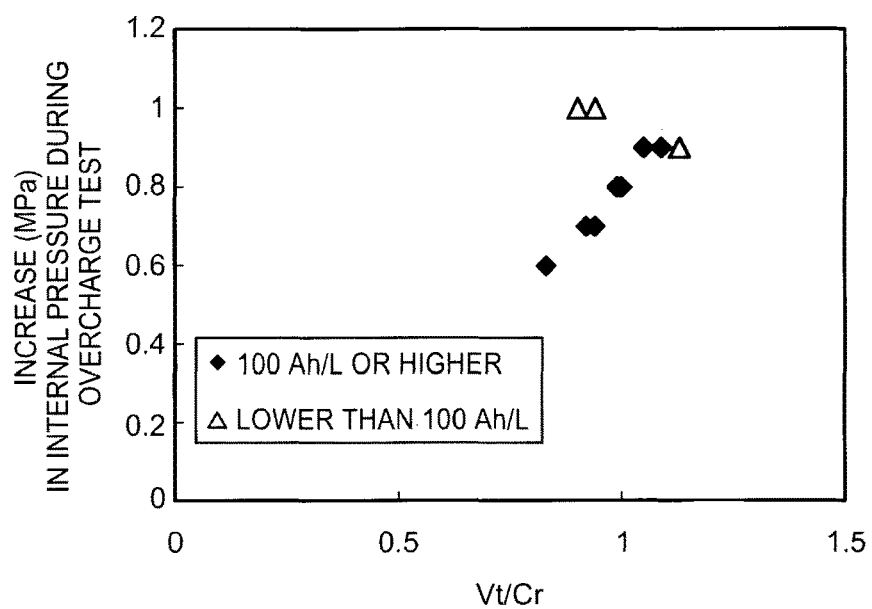
FIG. 6A is a graph showing a relationship between Vt/Cr and an increase in internal pressure during overcharge.

As shown in FIGS. 5 and 6A, in Examples 9 to 11 in which the initial capacity per unit volume was lower than 100 Ah/L, the battery internal pressure was suitably increased during overcharge, irrespective of the values of Vt/Cr and Cr/Ct (vol %). In addition, the malfunction of the CID was not observed in the high-temperature storage test.

On the other hand, the results of Examples 1 to 8 in which the initial capacity per unit volume was 100 Ah/L or higher are as follows. In Example 6 in which Vt/Cr was 0.83, an increase in internal pressure during overcharge was low, and the overcharge gas amount was insufficient. The reason is presumed to be that the volume of pores in the electrode body, which were reaction fields of the gas producing agent, was lower than the remaining space volume in the battery case. Accordingly, it can be seen that Vt/Cr is necessarily 0.92 or higher from the viewpoint of rapidly operating the CID. In addition, when Vt/Cr is higher than 1.05, there is no technical advantages. Therefore, from the viewpoint of obtaining a high level of battery capacity and overcharge resistance, Vt/Cr is preferably 1.05 or lower. In addition, in Examples 7 and 8 in which Cr/Ct was 13.2 vol % or lower, the CID malfunctioned several times in the high-temperature storage test. The reason is presumed to be that, by the battery being stored in a severe environment for a long period of time, a large amount of gas was unexpectedly produced, and the internal pressure of the battery case was largely increased due this gas. Accordingly, it can be seen that when the battery is likely to be exposed to a severe environment, Cr/Ct is necessarily 14.8 vol % or higher (for example, 14.8 vol % to 17.7 vol %) from the viewpoint of preventing the malfunction of the CID during normal use. These results show the technical significance of the invention.

Figure 6B:
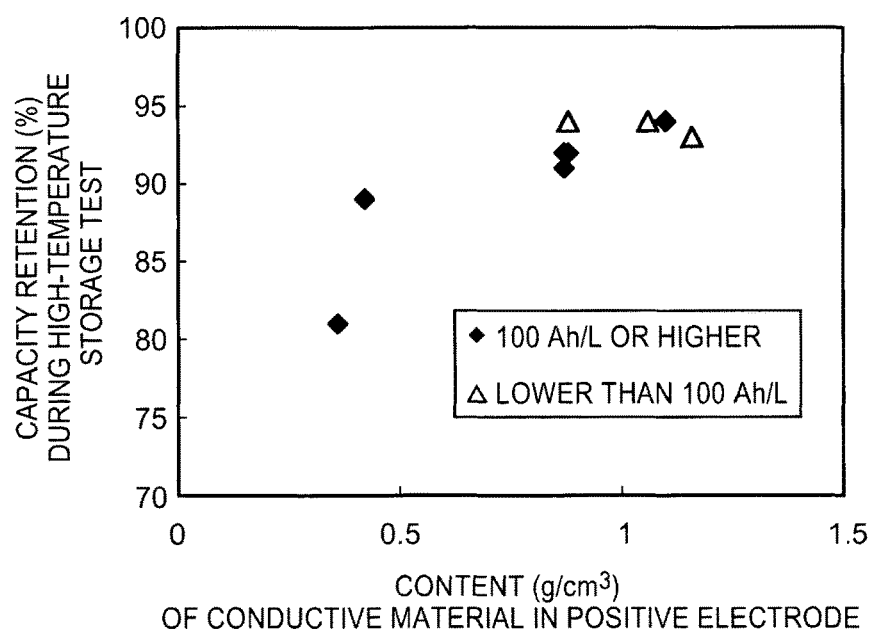
FIG. 6B is a graph showing a relationship between the content of a conductive material per unit effective pore volume of a positive electrode active material layer and a capacity retention during a high-temperature storage test.
Figure 6C:
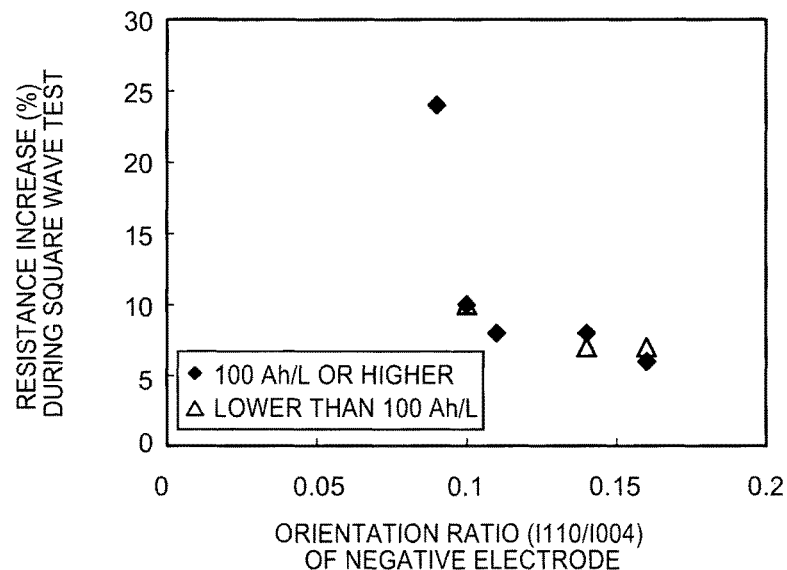
FIG. 6C is a graph showing a relationship between an orientation ratio of a negative electrode active material layer and a resistance increase during a square wave test.
Figure 6D:
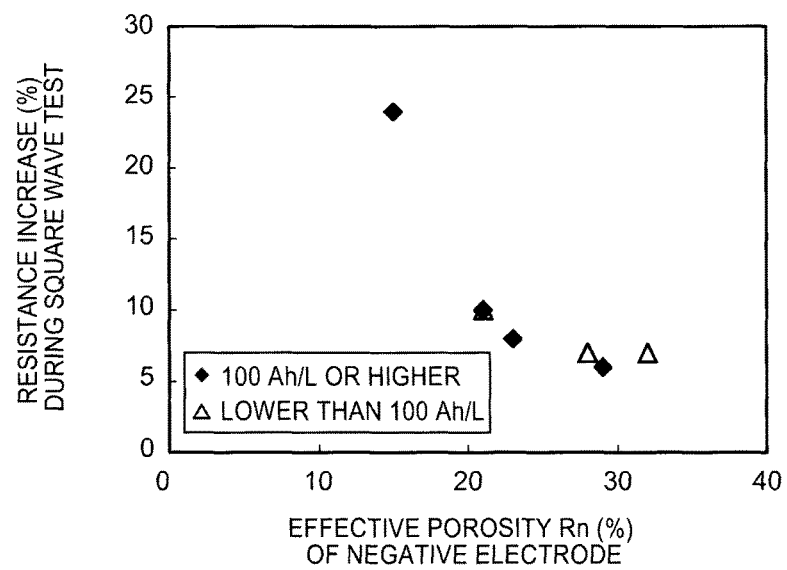
FIG. 6D is a graph showing a relationship between an effective porosity Rn of a negative electrode active material layer and a resistance increase during a square wave test.

Further, the electrode configurations and the battery characteristics are compared to each other. FIG. 6B shows a relationship between the content (g/cm³) of the conductive material per unit effective pore volume of the positive electrode active material layer and the capacity retention (%) during the high-temperature storage test. From the above results, it can be seen: that the capacity retention after the high-temperature storage can be made to be 89% or higher by adjusting the content of the conductive material to be 0.42 g/cm$^3$ or higher; and that the capacity retention after the high-temperature storage can be made to be 91% or higher by adjusting the content of the conductive material to be 0.87 g/cm$^3$ or higher (for example, 0.87 g/cm$^3$ to 1.10 g/cm$^3$). Accordingly, it can be seen that, when a storage environment or a usage environment is likely to be a high-temperature environment, the above-described range is preferable. FIG. 6C shows a relationship between the orientation ratio ($I_{110}/I_{004}$) of the negative electrode active material layer and the resistance increase during the square wave test. From the above results, it can be seen: that, when high-rate charging and discharging is likely to be repeated within a short period of time (for example, in a vehicle in which sudden acceleration and braking is repeated), the resistance increase can be suppressed to be low by adjusting the orientation ratio ($I_{110}/I_{004}$) of the negative electrode active material layer to be 0.1 or higher (preferably 0.11 or higher; for example, 0.11 to 0.16). In addition, FIG. 6D shows a relationship between the effective porosity Rn (vol %) of the negative electrode active material layer and the resistance increase (%) during the square wave test. From the above results, it can be seen: that, when high-rate charging and discharging is likely to be repeated within a short period of time (for example, in a vehicle in which sudden acceleration and braking is repeated), the resistance increase can be suppressed to be low by adjusting the effective porosity Rn of the negative electrode active material layer to be 21 vol % or higher (preferably 23 vol % or higher; for example, 23 vol % to 29 vol %).

As described above, by satisfying one or two or more of the above-described characteristics including the content (g/cm$^3$) of the conductive material per unit effective pore volume of the positive electrode, the orientation ratio ($I_{110}/I_{004}$) of the negative electrode active material layer, and the effective porosity Rn (%) of the negative electrode active material layer, a nonaqueous secondary battery having not only superior operability of the CID but also superior battery characteristics (for example, high-temperature storage characteristics and cycle characteristics) can be realized. From this point of view, it can be seen that the effective pore volume Vp of the positive electrode active material layer may be typically 10 cm$^3$ to 20 cm$^3$ (for example, 11 cm$^3$ to 15 cm$^3$). In addition, it can be seen that the effective porosity Rp (vol %) of the positive electrode active material layer may be typically 10 vol % to 25 vol % (preferably 13 vol % to 17 vol %; for example, 13 vol % to 15 vol %). In the above-described range, the electrolytic solution is suitably impregnated into the positive electrode active material layer, and during normal use, the target energy density and output density can be stably realized. In addition, during overcharge, the target overcharge gas amount can be stably obtained. In addition, it can be seen that the effective pore volume Vn of the negative electrode active material layer may be typically 10 cm$^3$ to 35 cm$^3$ (for example, 20 cm$^3$ to 30 cm$^3$).

Hereinabove, the invention has been described in detail, but the above-described embodiments and examples are merely exemplary. The invention disclosed herein includes various modifications and alternations of the above-described specific examples.

The invention claimed is:

1. A nonaqueous secondary battery having an initial capacity of 100 Ah/L or higher per unit volume, the nonaqueous secondary battery comprising:

an electrode body that includes a positive electrode including a positive electrode active material layer, a negative electrode including a negative electrode active material layer, and a separator interposed between the positive electrode and the negative electrode;
a nonaqueous electrolytic solution containing a gas producing agent that is decomposed at higher than a predetermined battery voltage to produce gas;
a battery case that accommodates the electrode body and the nonaqueous electrolytic solution together with auxiliary components; and
a current interrupt device that operates when an internal pressure of the battery case is higher than a predetermined pressure,
wherein a ratio of a pore volume of the electrode body represented by the following equation (1) to a remaining space volume in the battery case represented by the following equation (2) is 0.92 to 1.05, $$Vt = Vp + Vn + Vs \quad (1)$$

$$Cr = Ct - (Ce + Cna + Cc) \quad (2)$$

where
Vt represents the pore volume of the electrode body,
Vp represents an effective pore volume of the positive electrode active material layer,
Vn represents an effective pore volume of the negative electrode active material layer,
Vs represents a pore volume of the separator,
Cr represents the remaining space volume in the battery case,
Ct represents a volume of the battery case,
Ce represents a volume of the electrode body,
Cna represents a volume of the nonaqueous electrolytic solution, and
Cc represents a total volume of the auxiliary components accommodated in the battery case, and
the remaining space volume in the battery case is 14.8 vol % or higher of the volume of the battery case.

2. The nonaqueous secondary battery according to claim 1, wherein
an effective porosity of the negative electrode active material layer is 23 vol % to 29 vol % when being calculated by dividing the effective pore volume of the negative electrode active material layer by an apparent volume of the negative electrode active material layer to obtain a value and then multiplying the obtained value by 100.

3. The nonaqueous secondary battery according to claim 1, wherein
the positive electrode active material layer contains a conductive material, and
a content of the conductive material per unit effective pore volume of the positive electrode active material layer is 0.87 g/cm$^3$ to 1.1 g/cm$^3$.

4. The nonaqueous secondary battery according to claim 1, wherein
the negative electrode active material layer contains a graphite-based carbon material, and
a ratio of a peak intensity $I_{110}$ of a (110) plane to a peak intensity $I_{004}$ of a (004) plane based on X-ray crystal structure analysis of the negative electrode active material layer is 0.14 to 0.16.

5. The nonaqueous secondary battery according to claim 1, wherein the negative electrode active material layer contains spherical graphite obtained by spheroidizing a graphite-based carbon material.

6. The nonaqueous secondary battery according to claim 1, wherein the gas producing agent contains at least one of biphenyl or cyclohexylbenzene, and a content of the gas producing agent is 5 mass % or lower of a total mass of the nonaqueous electrolytic solution.

* * * * *